Feb. 2, 1937.    E. CREUTZ    2,069,519

AIR PREHEATER

Filed April 20, 1935

INVENTOR
EMIL CREUTZ
BY
ATTORNEY

Patented Feb. 2, 1937

2,069,519

UNITED STATES PATENT OFFICE 2,069,519

AIR PREHEATER

Emil Creutz, Forest Hills, N. Y., assignor to The Air Preheater Corporation, New York, N. Y.

Application April 20, 1935, Serial No. 17,453

5 Claims. (Cl. 257—245)

This invention relates to so-called air preheaters which serve in general to transfer heat from one gas to another without mingling the two and has for its purpose the provision of certain improvements which will be clear from a reading of the following description. The description is based on the use of the invention in connection with blast furnace gases and contemplates as one of the steps in the process the washing of such gases. The invention, however, has use in other relations.

Figure 1:
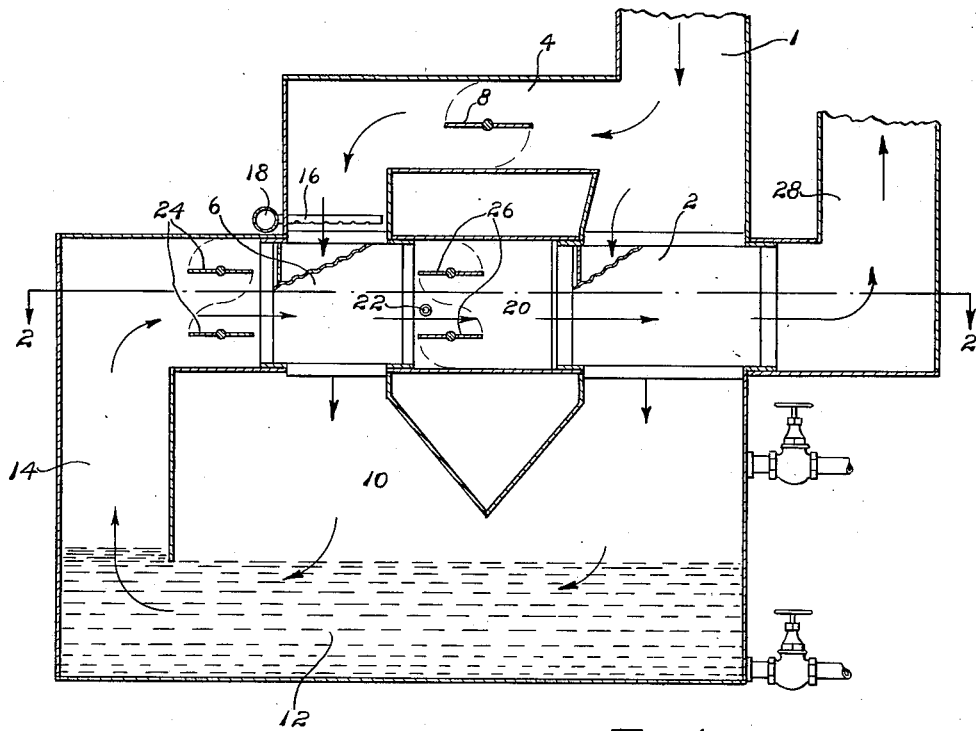
Figure 2:
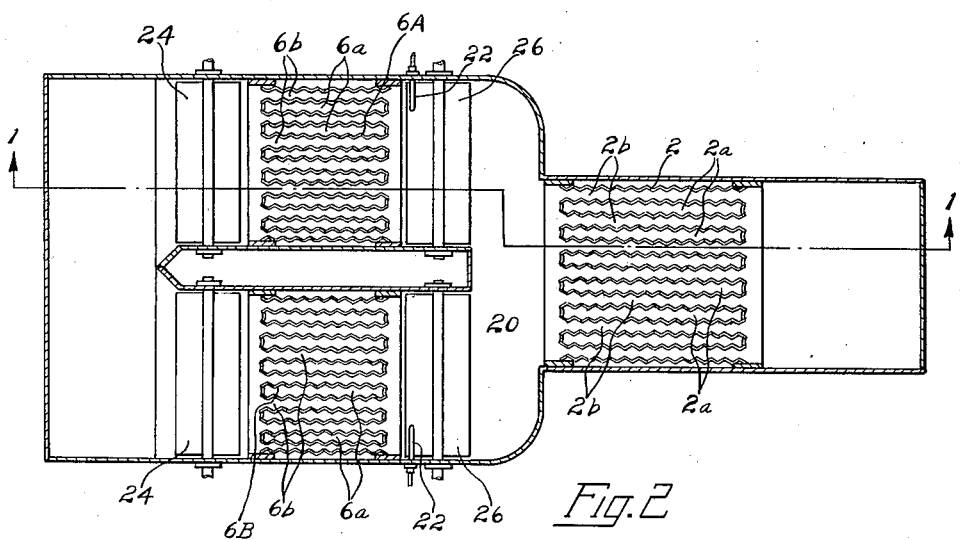

The specification makes reference to the drawing filed herewith in which Fig. 1 is a vertical longitudinal section more or less diagrammatic through an apparatus embodying my improvement, Fig. 2 being a section on line 2—2 of Fig. 1.

The hot gases coming from the blast furnace enter the apparatus through the duct 1. These gases are heavily laden with dust. Their temperature will usually be in the neighborhood of 400° F. To remove the dust, the gases are sent through a washer or scrubber in which they mingle intimately with a washing or scrubbing liquid. This reduces their temperature to approximately that of such liquid and this would result in a loss of a considerable amount of heat. In order to avoid such loss and to conserve this heat, it has been proposed heretofore to send the hot gases through one set of passages in an air preheater to give up heat prior to their scrubbing and then after they have been scrubbed to send them through a second set of passages in the air preheater to re-absorb heat, the washed gases not coming into contact with the hot dusty gases.

A difficulty has been experienced in practice in connection with preheaters so arranged. The gases that have been scrubbed and correspondingly cooled, on flowing through the air preheater cool the portions adjacent to their point of entry down so far that the dew point of the hot dust-laden gases may be reached. It will be understood that the gases from the blast furnace in addition to carrying much dust are heavily charged with moisture so that their temperature does not have to be reduced so very far before reaching the dew point. When the dew point is reached, the surfaces with which the gases come in contact will become wet and the dust in the hot gases will adhere to the wet surface and clog up the passages. This material can not be removed except by washing. The difficulty is particularly acute in the case of plate preheaters where good engineering requires that the plates be closely spaced.

In my arrangement I send the main portion of the gases entering through flue 1 through a main air preheater 2. They flow through a set of passages indicated at 2a—2a in Fig. 2. A smaller portion of these gases is diverted through the branch ducts 4 to a subsidiary or auxiliary air preheater 6 where they flow through passages 6a—6a. The relative amount diverted can be regulated by means of the dampers 8 in ducts 4. The two streams of gases on leaving the preheater enter the common chamber 10 of the scrubber where they are scrubbed by means of being bubbled through the washing liquid 12 or by any other preferred means. After such scrubbing, they are directed by a duct 14 to the air preheaters 6 and 2 where they flow through passages 6b, 6b and 2b, 2b respectively, out of communication with the passages 6a and 2a. They flow first through the passages 6b, 6b of the auxiliary preheater 6 and in doing so absorb sufficient heat so that in no part of the main preheater 2 will the dew point of the hot gases be reached. As a result, any condensation that occurs on the hot gas side will be localized in the auxiliary preheater 6. This simplifies the problem of cleaning and repair very materially. The main preheater 2 will require very little, if any, cleaning and what cleaning is required can be done by blowing air or other gas through passages 2a—2a. The principal call for cleaning is in the auxiliary preheater 6. This cleaning will usually have to be done by washing and in the example illustrated, means for washing the passages 6a, 6a are shown, these means consisting in sprays 16 which are supplied with water or other washing liquid by means of pipe 18. It will be understood that there is a series of these sprays 16, as many being installed as required for effectually washing out the material that clogs the passages. This washing will be done periodically as required. The water used for washing is preferably allowed to flow into chamber 10 to mix with liquid 12, although if preferred it can be caught in trays and diverted to some other point.

When dust collects in the passages 6a, 6a, it interferes with the heat transfer from the hot gases to the gases flowing through the passages 6b, 6b. As a result, the temperature in the passage 20 between the main and the auxiliary preheater will fall. This fact is taken advantage of to indicate when washing is required. Thermometers 22 are installed in the space 20. When these indicate a temperature drop of a certain magnitude, it will be an indication that the clogging up has proceeded to a point where washing is required. The precise temperature may vary in different installations, depending upon the circumstances such as the moisture content of the hot gases, their temperature, etc.

If the gas flow through passages 6b—6b were continued during washing, the gases might reach the main preheater 2 at so low a temperature that they would cause condensation in passages 2a—2a. To avoid this, the auxiliary heater 6 is divided into two sections, 6A, 6B, which are arranged in parallel. Dampers 24—24 and 26—26 are arranged in advance of and behind the preheater sections 6A and 6B so that one section can be washed at a time and the other completely closed off during such period. While a section is being washed, its damper 8 will also be kept closed.

The gases after passing through the main preheater are carried to the point of use by means of the duct 28.

It may also happen in an arrangement such as described that the gases entering the preheater to absorb heat carry over so much evaporated and entrained moisture from the scrubber that the surfaces with which they first come into contact may become wetted. If the solid impurities have not all been removed in the scrubber, they may adhere to the wet surfaces and clog the passages. This, however, together with whatever washing or other remedy is required will also, due to the arrangement, be confined to the auxiliary heater.

While I have in the above described the invention in connection with preheaters of the plate type, it will be obvious that it is not limited to this type of preheater. Neither is it limited to preheaters made of any particular material. The selection of the type of preheater and of the material used will be governed by considerations such as the character of the medium to be heated or the medium which delivers the heat.

Apparatus of the type described above may be used advantageously in connection with certain drying operations where the medium carrying the heat for the drying operation travels in a closed system and must be kept clean. In such an installation the hot gases, which contain too many impurities to be used directly as a drying agent, are passed through the air preheater and give up their heat to clean air which then is carried to the kiln or other drier where it gives up its heat and from which it is returned to the preheater. The arrangement described above prevents the impurities in the heating gases from settling against wet surfaces in the main preheater, this being accomplished in a manner exactly analogous to that described above. Whatever impurities do settle on wet surfaces do so in the auxiliary preheater. In such a case the hot gases, after having given up their heat, are carried to a stack or other point of disposal.

What I claim is:

1. In apparatus of the class described the combination of a main and a separate auxiliary preheater each of the type through which hot gases may flow in heat transfer relations but out of contact with cool gases to heat the latter, means to cause hot gases to flow in part through the main and in part through the auxiliary heater, and means to cause cool gas, which is to be heated, to flow first through the auxiliary and then through the main preheater, the size of the auxiliary preheater being such as to heat the cool gas sufficiently so it will not cool any part of the main preheater to the dew point of the hot gases.

2. In apparatus of the class described, the combination of a main and a separate auxiliary preheater each of the type through which hot gases may flow in heat transfer relations but out of contact with cool gases to heat the latter, means to cause hot gases to flow in part through the main and in part through the auxiliary heater, means to cause cool gas, which is to be heated, to flow first through the auxiliary and then through the main preheater, the size of the auxiliary preheater being such as to heat the cool gas sufficiently so it will not cool any part of the main preheater to the dew point of the hot gases, and means to clean the auxiliary preheater on the side touched by the hot gases.

3. In apparatus of the class described, the combination of a main and a separate auxiliary preheater each of the type through which hot gases may flow in heat transfer relations but out of contact with cool gases to heat the latter, means to cause hot gases to flow in part through the main and in part through the auxiliary heater, means to cause cool gas, which is to be heated, to flow first through the auxiliary and then through the main preheater, the size of the auxiliary preheater being such as to heat the cool gas sufficiently so it will not cool any part of the main preheater to the dew point of the hot gases, and means to wash the auxiliary preheater on the side touched by hot gases by flushing it with a liquid.

4. In apparatus of the class described, the combination of a main and an auxiliary preheater each of the type through which hot gases may flow in heat transfer relations but out of contact with cool gases to heat the latter, means to cause hot gases to flow in part through the main and in part through the auxiliary heater, means to cause cool gas, which is to be heated, to flow first through the auxiliary and then through the main preheater, the size of the auxiliary preheater being such as to heat the cool gas sufficiently so it will not cool any part of the main preheater to the dew point of the hot gases, the path through the auxiliary preheater of the gas to be heated being divided into a plurality of parts, means to shut off the parts one at a time, and means to wash each part on the side touched by hot gases while such part is shut off.

5. Apparatus for treating blast furnace gases comprising a main and an auxiliary preheater of the plate type with two sets of passages through which two streams of gases may flow in heat transfer relation to each other but without mingling, means to cause the blast furnace gases to flow in part through one set of passages of the main preheater and in part through one set of passages of the auxiliary preheater, means to wash impurities out of the gases after they have so flowed through the preheaters, means to cause the gases after such washing to pass through the second set of passages of the auxiliary preheater and then through the second set of passages of the main preheater, the size of the auxiliary preheater being such as to heat the washed gases sufficiently so they will not cool any part of the main preheater below the dew point of the gases flowing through the first set of passages, and means to wash the first set of passages of the auxiliary preheater.

EMIL CREUTZ.